US012784759B2

(12) United States Patent
Yin et al.

(10) Patent No.: US 12,784,759 B2
(45) Date of Patent: Nov. 3, 2026

(54) SYSTEM AND METHOD FOR VOICE UNIDENTIFIABLE MORPHING

(71) Applicant: SoundHound AI IP, LLC, Santa Clara, CA (US)

(72) Inventors: Ziming Yin, Toronto (CA); Zili Li, Orlando, FL (US)

(73) Assignee: SOUNDHOUND AI IP, LLC, Santa Clara, CA (US)

( * ) Notice: Subject to any disclaimer, the term of this patent is extended or adjusted under 35 U.S.C. 154(b) by 0 days.

(21) Appl. No.: 17/694,703

(22) Filed: Mar. 15, 2022

(65) Prior Publication Data

US 2023/0298607 A1 Sep. 21, 2023

(51) Int. Cl.

*G10L 21/013* (2013.01)
*G06N 20/00* (2019.01)
*G10L 17/00* (2013.01)
*G10L 21/10* (2013.01)

(52) U.S. Cl.

CPC ............ *G10L 21/013* (2013.01); *G06N 20/00* (2019.01); *G10L 17/00* (2013.01); *G10L 21/10* (2013.01); *G10L 2021/0135* (2013.01)

(58) Field of Classification Search

CPC ... G10L 21/013; G10L 13/0335; G10L 13/06; G10L 13/08; G10L 17/00; G10L 17/02; G10L 17/06; G10L 21/10; G10L 2021/0135; G06F 21/16; G06F 21/32; G06F 21/53; G06F 21/602; G06F 21/6254; G06F 40/20; G06N 3/045; G06N 3/0464; G06N 3/08; G06N 3/09; G06N 20/00; G08B 13/1672

See application file for complete search history.

(56) References Cited

U.S. PATENT DOCUMENTS

| | | | |
|---|---|---|---|
| 5,567,901 | A | 10/1996 | Gibson et al. |
| 5,749,073 | A | 5/1998 | Slaney |
| 5,893,057 | A | 4/1999 | Fujimoto et al. |
| 5,946,658 | A | 8/1999 | Miyazawa et al. |
| 5,986,198 | A | 11/1999 | Gibson et al. |
| 6,336,092 | B1 | 1/2002 | Gibson et al. |

(Continued)

FOREIGN PATENT DOCUMENTS

| | | | |
|---|---|---|---|
| EP | 2215632 | A1 | 8/2010 |
| WO | 2019116889 | A1 | 6/2019 |

OTHER PUBLICATIONS

Fang, Fuming, et al. "High-quality nonparallel voice conversion based on cycle-consistent adversarial network." 2018 EEE International Conference on Acoustics, Speech and Signal Processing (ICASSP). IEEE, 2018. (Year: 2018).

(Continued)

*Primary Examiner* — Gerald Gauthier
(74) *Attorney, Agent, or Firm* — Pearl Cohen LLP

(57) ABSTRACT

A system and a method are disclosed for a machine learned audio morpher that is trained such that the voice characteristics of a user spoken phrase are replaced with those of a target speaker, which removes and/or reduces the user identifiable information for the spoken phrase. Training can be performed by a user and a target speaker speaking the same or similar phrases and training the audio morpher to minimize the differences between the target speaker phrase and a morphed user phrase.

9 Claims, 14 Drawing Sheets

(56) References Cited

U.S. PATENT DOCUMENTS

| | | | | |
|---|---|---|---|---|
| 7,412,383 | B1 | 8/2008 | Alonso et al. | |
| 8,170,878 | B2 * | 5/2012 | Liu | G10L 13/033 704/235 |
| 8,457,974 | B2 * | 6/2013 | Wang | G06F 21/32 704/270.1 |
| 8,543,402 | B1 | 9/2013 | Ma | |
| 8,630,860 | B1 | 1/2014 | Zhang et al. | |
| 9,009,052 | B2 * | 4/2015 | Nakano | G10L 13/033 84/645 |
| 9,984,700 | B2 * | 5/2018 | Cohen | G10L 21/013 |
| 10,008,216 | B2 * | 6/2018 | Yassa | G10L 25/90 |
| 10,249,314 | B1 | 4/2019 | Aryal | |
| 10,839,809 | B1 | 11/2020 | Jha et al. | |
| 11,100,940 | B2 | 8/2021 | Pearson | |
| 11,205,056 | B2 | 12/2021 | Ross | |
| 12,086,564 | B2 | 9/2024 | Ross | |
| 12,164,619 | B1 * | 12/2024 | Rodriguez | G06F 21/32 |
| 2004/0064317 | A1 | 4/2004 | Othmer et al. | |
| 2008/0147413 | A1 | 6/2008 | Sobol-Shikler | |
| 2008/0195387 | A1 | 8/2008 | Zigel et al. | |
| 2009/0030865 | A1 | 1/2009 | Sawada | |
| 2009/0037179 | A1 * | 2/2009 | Liu | G10L 13/08 704/260 |
| 2009/0089063 | A1 * | 4/2009 | Meng | G10L 21/00 704/E21.001 |
| 2009/0281807 | A1 | 11/2009 | Hirose et al. | |
| 2011/0087491 | A1 | 4/2011 | Wittenstein et al. | |
| 2013/0019738 | A1 | 1/2013 | Haupt et al. | |
| 2013/0151256 | A1 * | 6/2013 | Nakano | G10L 13/0335 704/268 |
| 2013/0311173 | A1 * | 11/2013 | Cohen | G10L 21/013 704/207 |
| 2014/0195222 | A1 | 7/2014 | Peevers et al. | |
| 2015/0336578 | A1 | 11/2015 | Lord et al. | |
| 2016/0336023 | A1 | 11/2016 | Guyott et al. | |
| 2017/0249953 | A1 * | 8/2017 | Yassa | G10L 13/06 |
| 2018/0254046 | A1 * | 9/2018 | Khoury | G10L 17/02 |
| 2018/0342256 | A1 | 11/2018 | Huffman et al. | |
| 2019/0051314 | A1 | 2/2019 | Nakashika et al. | |
| 2019/0066658 | A1 | 2/2019 | Fujioka et al. | |
| 2019/0304480 | A1 | 10/2019 | Narayanan et al. | |
| 2020/0143820 | A1 | 5/2020 | Donofrio | |
| 2020/0243094 | A1 * | 7/2020 | Thomson | G10L 15/28 |
| 2020/0296094 | A1 * | 9/2020 | Hoyos | G06F 21/32 |
| 2020/0388295 | A1 | 12/2020 | Angland | |
| 2020/0394320 | A1 * | 12/2020 | Bernau | G06N 3/08 |
| 2020/0395028 | A1 | 12/2020 | Kameoka et al. | |
| 2021/0005180 | A1 | 1/2021 | Kim | |
| 2021/0029114 | A1 * | 1/2021 | Richards | G06F 21/602 |
| 2021/0056405 | A1 * | 2/2021 | Bradshaw | G06F 21/602 |
| 2021/0192651 | A1 * | 6/2021 | Groth | G06F 21/16 |
| 2021/0193159 | A1 | 6/2021 | Pearson | |
| 2021/0200965 | A1 | 7/2021 | Yerli | |
| 2021/0217431 | A1 | 7/2021 | Pearson | |
| 2021/0225383 | A1 | 7/2021 | Takahashi | |
| 2021/0248268 | A1 * | 8/2021 | Ardhanari | G06F 21/53 |
| 2022/0068257 | A1 * | 3/2022 | Biadsy | G10L 13/033 |
| 2022/0068259 | A1 * | 3/2022 | Pan | G10L 25/63 |
| 2022/0335517 | A1 * | 10/2022 | Wellmann | G06F 40/20 |
| 2023/0228832 | A1 * | 7/2023 | Kozyr | G08B 13/1672 |
| 2023/0298607 | A1 * | 9/2023 | Yin | G10L 21/013 704/200 |

OTHER PUBLICATIONS

Alice Cohen-Hadria, Voice Anonymization in Urban Sound Recordings, 2019, UMR STMS 9912M / Sorbonne Universite, IRCAM, CNRS, France.

Battenberg et al. (2020). "Location-Relative Attention Mechanisms for Robust Long-Form Speech Synthesis". ICASSP 2020—2020 IEEE International Conference on Acoustics, Speech and Signal Processing (ICASSP). doi:10.1109/icassp40776.2020.9.

Ching-Hsiang Ho Formant model estimation and transformation for voice morphing. InSeventh International Conference on Spoken Language Processing 2002.

Chou et al. (2019) "One-shot Voice Conversion by Separating Speaker and Content Representations with Instance Normalization". arXiv:1904.05742v4.

Denis Stadniczuk, An open-source Octave toolbox for VTLN-based voice conversion. InProc. International Conference of the German Society for Computational Linguistics and Language Technology, Darmstadt, Germany Sep. 2013.

Desplanques et al. "ECAPA-TDNN: Emphasized Channel Attention, Propagation and Aggregation in TDNN Based Speaker Verification". Proc. Interspeech 2020, 3830-3834, doi: 10.21437/Interspeech.2020-2650.

Fahimeh Bahmaninezhad, Convolutional Neural Network Based Speaker De-Identification, Odyssey 2018, The Speaker and Language Recognition Workshop, Jun. 26-29, 2018, Les Sables d'Olonne, France, pp. 255-260.

Fuming Fang, Speaker Anonymization Using X-vector and Neural Waveform Models. arXiv preprint arXiv:1905.13561. May 30, 2019.

Hui Ye, Quality-enhanced voice morphing using maximum likelihood transformations. IEEE Transactions on Audio, Speech, and Language Processing. Jun. 19, 2006;14(4):1301-12.

Ido Cohn, Audio De-identification: A New Entity Recognition Task. arXiv preprint arXiv:1903.07037. Mar. 17, 2019.

Jaime Lorenzo-Trueba, Towards achieving robust universal neural vocoding. InProc. Interspeech 2019 (vol. 2019, pp. 181-185).

Kim et al. (2017). "Joint CTC-Attention based End-to-End Speech Recognition using Multi-task Learning". arXiv:1609.06773v2 [cs.CL].

Lifa Sun, Phonetic posteriorgrams for many-to-one voice conversion without parallel data training. In2016 IEEE International Conference on Multimedia and Expo (ICME) Jul. 11, 2016 (pp. 1-6). IEEE.

Liu et al. "Any to Many Voice Conversion With Location Relative Sequence to Sequence Modeling". IEEE/ACM Transactions on Audio, Speech, and Language Processing, vol. 29, 2021.

Mohamed Abou-Zleikha, A Discriminative Approach for Speaker Selection in Speaker De-Identification Systems, 2015, 23rd European Signal Processing Conference (EUSIPCO), pp. 2102-2106.

Nal Kalchbrenner, Efficient neural audio synthesis. arXiv preprint arXiv:1802.08435. Feb. 23, 2018.

Qian et al. "Global Rhythm Style TransferWithout Text Transcriptions". Proceedings of the 38th International Conference on MachineLearning, PMLR 139, 2021.

Qin Jin, Speaker de-identification via voice transformation. In2009 IEEE Workshop on Automatic Speech Recognition & Understanding 2009 (pp. 529-533). IEEE.

Ryan Prenger, Waveglow: A flow-based generative network for speech synthesis. InICASSP 2019—2019 IEEE International Conference on Acoustics, Speech and Signal Processing (ICASSP) May 12, 2019 (pp. 3617-3621). IEEE.

Sajedur Rahman, Pitch shifting of voices in real-time. Computer Engineering.;2:35163.

Shen et al. (2018). "Natural TTS Synthesis by Conditioning WaveNet on Mel Spectrogram Predictions". arXiv:1712.05884.

Sisman et al. "An Overview of Voice Conversion and Its Challenges: From Statistical Modeling to Deep Learning". IEEE/ACM Transactions on Audio, Speech, and Language Processing, vol. 29, 2021.

Snyder et al. "X-Vectors: Robust Dnn Embeddings for Speaker Recognition" 2018 IEEE International Conference on Acoustics, Speech and Signal Processing (ICASSP), 2018, pp. 5329-5333, doi: 10.1109/ICASSP.2018.8461375.

Wan et al. (2020). "Generalized End-to-End Loss for Speaker Verification". arXiv:1710.10467v5 [eess.AS] Nov. 9, 2020.

Qian et al., "VoiceMask: Anonymize and Sanitize Voice Input on Mobile Devices," arXiv:1711.11460v1 [cs.CR] Nov. 30, 2017 (Year: 2017).

(56) References Cited

OTHER PUBLICATIONS

Office Action dated Apr. 16, 2026 in U.S. Appl. No. 18/778,301.
Mousa, Allam, "Voice Conversion Using Pitch Shifting Algorithm By Time Stretching With Psola and Re-Sampling", Journal of Electrical Engineering, vol. 61, No. 1, Jan. 2010.

* cited by examiner

SYSTEM AND METHOD FOR VOICE UNIDENTIFIABLE MORPHING

FIELD OF THE DISCLOSURE

The present technology is in the field of computer systems and, more specifically, related to morphing the voice of a user.

BACKGROUND

As voice-controlled electronics become more ubiquitous, the need to protect a user's privacy becomes an ever increasing concern. Though previous user voice interaction is a relevant way to train machine learning based voice-controlled electronics, user's generally do not want their identity stored, and some regulations require identity information to be deleted after a time period.

One way to train a speech recognition system is to have human reviewers listen to the voice commands spoken by users and correct any voice commands that were recognized incorrectly. With human reviewers, it can be important to hide the identity of the users in order to protect the privacy of the users.

SUMMARY

According to various examples, audio of a spoken phrase of a user is morphed in such a way as the morphed spoken phrase seems to have been spoken by a target speaker. According to various examples, the voice characteristics of a user spoken phrase is replaced with a target speaker. According to various examples, the morphing is performed by an audio morpher that includes a machine learned (ML) morphing model.

The morpher is trained to change the sound of the voice of the user while keeping words spoken in the morphed audio intelligible. An automated way of testing the morpher for irreversibility of voice morphing is the compare the input and output audio using an automated speaker verification model with an objective of 50% rates of correct and incorrect speaker verification. An automated way of testing the morpher for intelligibility of the words in the output audio is to apply automatic speech recognition and measure the word recognition error rate with an objective of a low error rate for the morphed audio. The morpher is trained in such a way as to make determining the identity of the user from the morphed audio very difficult, especially when using a speaker verification model speaker verification model and making the morphed audio intelligible as calculated by a speech recognition word error rate.

According to various examples, a training method is to have a user and a target speaker speak the same or similar phrase and train the model to minimize the differences between the spectral information in the audio of the target speaker phrase and the morphed user phrase. By training the morpher such that the morpher produces a small difference in spectral components compared to the target speaker, the identifiability of the voice of the user may be reduced and the morphed audio may be intelligible. For a training example, the target speaker audio is converted to a mel-spectrogram, and the user audio is morphed and then converted to another mel-spectrogram. Next, the morpher is trained to make the morphed user audio mel-spectrogram similar to the target speaker mel-spectrogram. For example, a training objective function may be to minimize the difference between the target speaker mel-spectrogram and the morphed user audio mel-spectrogram. For another example, a training objective function may be to minimize the mean squared error (MSE) between the values in the frequency bins of target speaker mel-spectrogram and the morphed user audio mel-spectrogram. As the user and target speaker may speak at different speeds, training may include a step of aligning the spoken phrase of the target speaker and the user.

According to various examples, a random target speaker is chosen when a spoken phrase of the user is morphed to further assist in hiding the identity of the user. By using a random target speaker during morphing, the morphed audio samples have another layer of protection to make determining the identity of the user from the morphed audio even more challenging.

DETAILED DESCRIPTION

Figure 1:
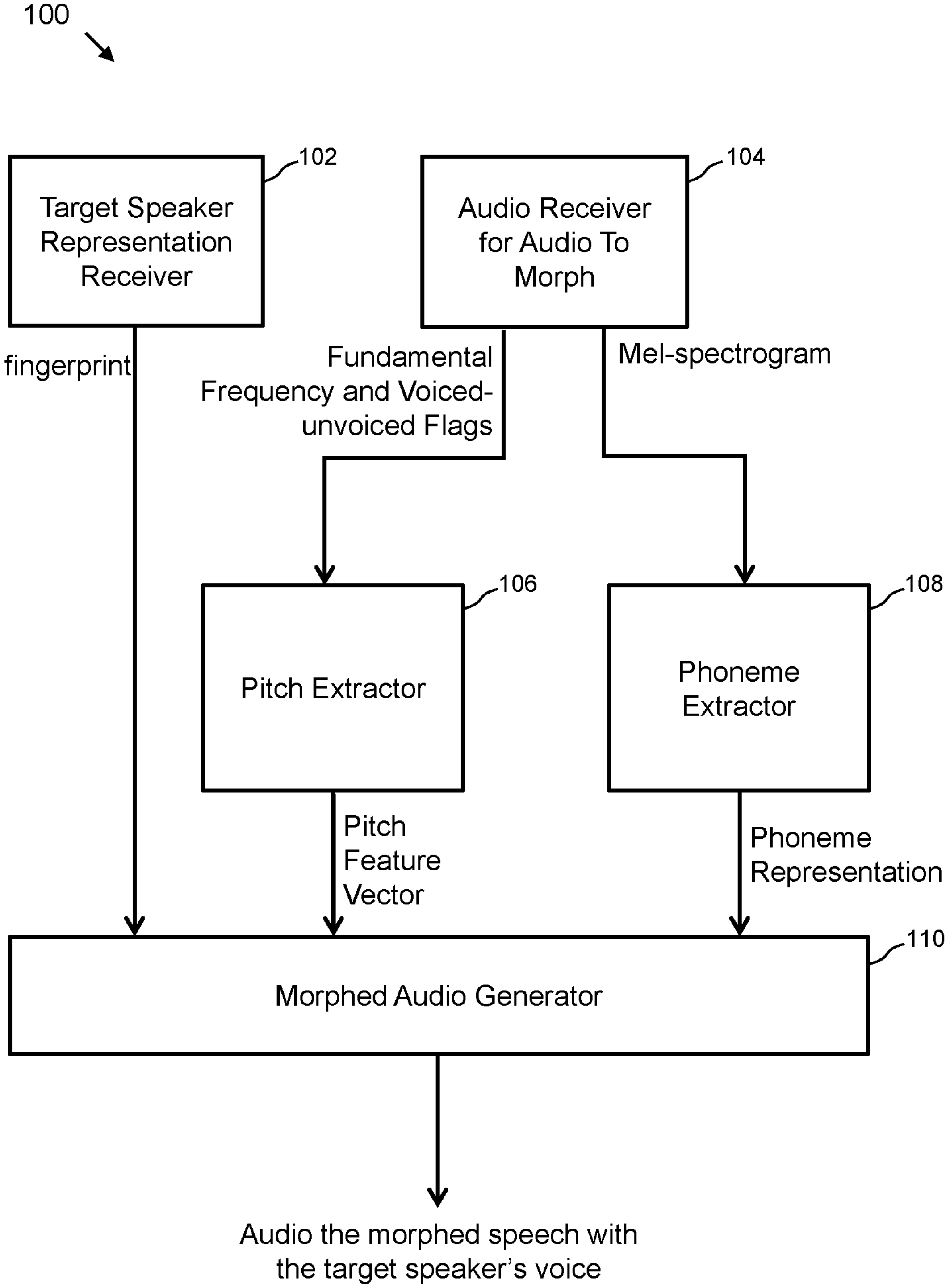
FIG. 1 shows a system's method for creating morphed audio from a user spoken phrase and a target speaker representation in accordance with various examples.

The following describes various examples of the present technology that illustrate various interesting aspects. Generally, examples can use the described aspects in any combination. All statements herein reciting principles, aspects, and examples are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one," "an," "certain," "various," and "cases", "examples" or similar language means that a particular aspect, feature, structure, or characteristic described in connection with the example is included in at least one embodiment of the invention. Thus, appearances of the phrases "in one case," "in at least one example," "in an example," "in certain cases," and similar language throughout this specification may, but do not necessarily, all refer to the same embodiment or similar embodiments. Furthermore, aspects and examples of the invention described herein are merely exemplary, and should not be construed as limiting of the scope or spirit of the invention as appreciated by those of ordinary skill in the art. The disclosed invention is effectively made or used in any example that includes any novel aspect described herein. Furthermore, to the extent that the terms "including", "includes", "having", "has", "with", or variants thereof are used in either the detailed description and the claims, such terms are intended to be inclusive in a similar manner to the term "comprising." In examples showing multiple similar elements, even if using separate reference numerals, some such examples may work with a single element filling the role of the multiple similar elements.

Morphing Voice of a User

The following describes systems of process steps and systems of machines and components for morphing a user spoken phrase. Some implementations use computers that execute software instructions stored on non-transitory computer readable media. Examples below show design choices for various aspects of such systems. In general, design choices for different aspects are independent and can work together in any combination.

An approach for a speech recognition system to determine if the system understood what a user spoke correctly is to have a human data labeler listen to the spoken phrase recording and compare it to a machine transcription of what the user spoke. When the speech recognition system is based on machine learning (ML), the feedback from the human data labeler can be used to train the ML model thus improving the performance of the speech recognition system.

A challenge with having a human data labeler listen to recordings of the user's spoken phrase is that identity of the user can be exposed to the human data labeler through the voice of the user. Users generally desire privacy, and some jurisdictions have legislation that forbids user information that contains user identity information to be retained after a prescribed amount of time. For jurisdictions with such legislation, removing the identity of the user from the user spoken phrases allows lawful permanent retention of the spoken phrases.

One way to hide the user's identity is to morph spoken phrases from the user. Classical audio morphing algorithms (e.g., pitch shift, time stretch, add noise, random clipping, etc.) generally perform well at hiding the identity of the user from the human data labeler but do not perform well hiding the identity of the user from a reversing model, especially a ML reversing model. In other words, it is generally easy to disguise the user's identity from the human data labeler but generally hard to disguise the user's identity from a machine designed to reverse the morphing. Additionally, classical morphing algorithms can distort the voice of the user to the point where the human data labeler cannot understand the morphed voice of the user. Even when the human data labeler can understand the morphed audio, the morphed audio may sound robotic which makes the labeling by the human data labeler more challenging and error prone.

In general, a spoken phrase from the user contains four types of information. The first type of information of a spoken phrase is the voice characteristics such as vocal tract specific characteristics. The voice characteristics are useful to identify the speaker. The voice characteristics of the speaker may be represented as a vector of voice feature values. The second type of information in a spoken phrase is the way in which the phrase, or parts of the phrase, are spoken. This can be described as pitch. Pitch may be used to convey part of the message of the spoken phrase. For example, in English, pitch may increase toward the end of a phrase to indicate a yes/no question is being asked. Pitch can include emphasis on certain words and/or intonation. Accent may be represented as a vector. According to various examples, accent may be part of the speaker representation. The third type of information in a spoken phrase is the words spoken. The words spoken may be represented as one or more phonemes or as written text. The fourth type of information in a spoken phrase is noise and distortion. For example, wind on a microphone, a door closing, or another person speaking in the background are examples of noise, and imperfections in the microphone and analog circuitry are examples of distortion.

If a morpher protects the sound of users' voices well, if will tend to have an error rate of close to 50% when input and output audio are compared using a speaker verification model. If the morpher preserves the words spoken well, the word error rate or phoneme recognition error rate will be as low for the morphed audio as it is for the input audio across a large data set. Speaker verification error rate may be measured as equal error rate (EER) of a speaker verification model evaluated over a large data set.

Word error rate (WER) of speech recognition applied to morphed voice audio can be measured by performing speech recognition on a large number of morphed voice samples of known words. Comparing the WER of input audio and output audio of a morpher can be used to determine how well the morpher preserves the intelligibility of morphed spoken phrases.

According to various examples, the voice characteristics of a user is replaced with target speaker voice characteristics in such a way as to remove the sound of the user's voice and thereby reduce user identifiable information while minimally degrading how intelligible the words are in the morphed audio. According to various examples, a seq2seq encoder can be used within an audio morpher such that the morphed speech can adopt the speed and style of time variations of speech characteristics of the target speaker.

Referring now to FIG. 1, according to one or more examples, a device is shown that creates morphed audio from a user spoken phrase and a target speaker representation. According to various examples, the user's spoken phrase has the voice components extracted that do not contain the sound of the user's voice and these components are combined with a voice fingerprint of a target speaker to morph the voice of the spoken phrase from the user such that the sound of the user's voice is removed and/or reduced. Audio morpher 100 morphs the spoken phrase of a user according to a voice fingerprint of a target speaker. Target speaker representation receiver 102 receives a vector of numbers that represent features of a target speaker's voice (also known as a voice fingerprint). The target speaker representation may be computed from samples of spoken phrases from a target speaker. The target speaker representation may also be known as a speaker embedding vector. The target speaker representation may be a d-vector, x-vector, or a vector computed using the error coded affine projection algorithm (ECAPA), for example. According to various examples, the d-vector of the target speaker is calculated per frame of audio analyzed. The d-vectors of all of the frames of an audio sample can be averaged to compute a d-vector for the full sample. According to various examples, d-vector may use a time delayed neural network and pooling to compute a single vector for an entire segment of speech. According to various examples, in an any-to-many conversion, each target speaker representation may be represented as a one-hot vector. According to various examples, target speaker representation receiver 102 can determine when two or more speakers are speaking and can extract the target speaker's voice. According to various examples, the target speaker's voice can be a synthesized voice.

Audio receiver for audio to morph 104 receives a spoken phrase from a user and converts the spoken phrase into a format compatible with a pitch extractor and a phoneme extractor. According to various examples, the spoken phrase from the user may be converted into a mel-spectrogram, fundamental frequency, and voiced-unvoiced flags. A mel-spectrogram is a spectrogram using frequency ranges evenly spaced along the mel scale. The mel scale represents the frequency sensitivity of the human auditory system. Other spectrogram frequency spacing can also be applied in implementations where it would be simpler to calculate or more specific to the characteristic spacing of frequency ranges of audio capture systems other than the human ear. According to various examples, audio receiver for audio to morph 104 uses a Fast Fourier transform of the spoken phrase from the user to compute the mel-spectrogram. According to various examples, audio receiver for audio to morph 104 includes a neural network. The spoken phrase from the user may be a live spoken phrase, a recorded spoken phrase, or any combination of the preceding.

Pitch extractor 106 extracts pitch from a representation of the spoken phrase of the user. According to various examples, inputs to the pitch extractor 106 are a fundamental frequency, and one or more voiced-unvoiced flags derived from the spoken phrase from the user. According to various examples, pitch extractor 106 determines a pitch feature vector. According to various examples, pitch extractor 106 includes a neural network (e.g., a convolutional network).

Phoneme extractor 108 extracts one or more phonemes from a representation of the spoken phrase of the user. According to various examples, input to the phoneme extractor 108 is a mel-spectrogram of the spoken phrase from the user. According to various examples, phoneme extractor 108 determines a phoneme representation. According to various examples, phoneme extractor 108 includes an acoustic model (AM). According to various examples, a classifier is used to determine a phoneme sequence.

Morphed audio generator 110 generates morphed audio from the spoken phrase of the user such that the spoken phrase sounds like it is in the voice of a target speaker. According to various examples, morphed audio generator 110 generates morphed audio according to the fingerprint of a target speaker, using the pitch feature vector of the spoken phrase from the user and phoneme representation of the spoken phrase from the user. According to various examples, morphed audio generator 110 includes a neural network. According to various examples, the neural network includes an attention mechanism. According to various examples, morphed audio generator 110 contains a vocoder (e.g., Tacotron) to convert the spoken phrase from the user to a mel-spectrogram.

Figure 2:
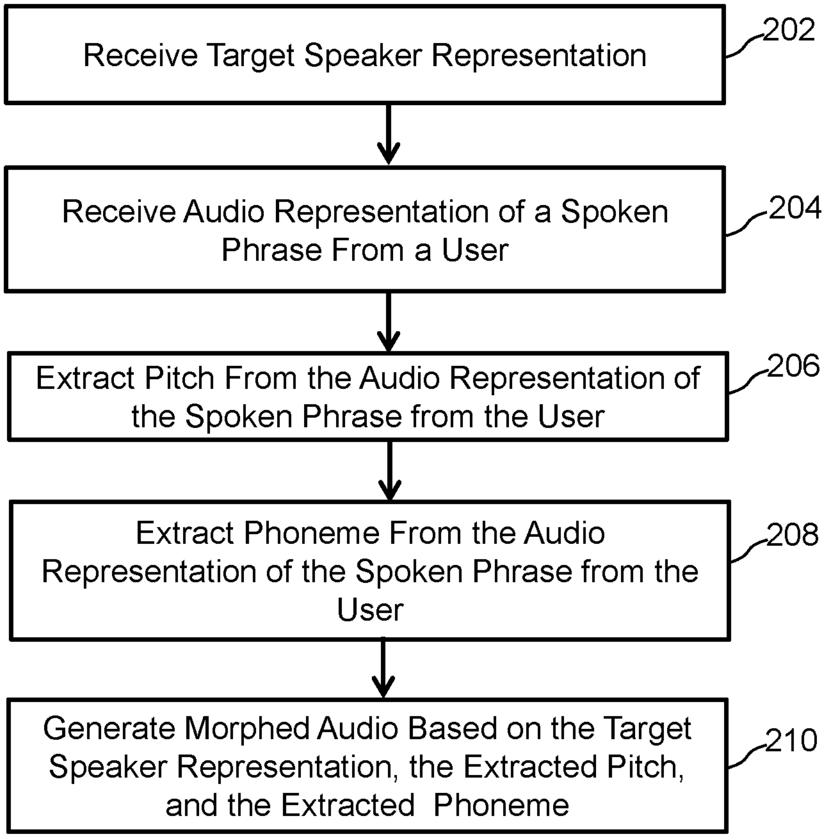
FIG. 2 is a flow diagram showing a method of creating morphed audio from a user spoken phrase and a target speaker representation in accordance with various examples.

Referring now to FIG. 2, according to one or more examples, a process is shown that creates morphed audio from a spoken phrase and a target speaker representation. At step 202, target speaker representation is received. According to various examples, the target speaker representation is a fingerprint extracted from target speaker audio. According to various examples, step 202 may perform the same or similar function as target speaker representation receiver 102.

At step 204, an audio representation of the spoken phrase from a user is received. According to various examples, a mel-spectrogram, fundamental frequency and voiced-unvoiced flags are extracted from the audio representation. According to various examples, step 204 may perform the same or similar function as audio receiver for audio to morph 104.

At step 206, pitch is extracted from the audio representation of the spoken phrase from the user. According to various examples, step 206 may perform the same or similar function as pitch extractor 106.

At step 208, one or more phonemes are extracted from the audio representation of the spoken phrase from the user. According to various examples, step 208 may perform the same or similar function as phoneme extractor 108.

At step 210 morphed audio is generated based on the target speaker representation, the extracted pitch of the audio representation of the spoken phrase from the user, and the extracted phoneme of the audio representation of the spoken phrase from the user. According to various examples, step 210 may perform the same or similar function as morphed audio generator 110.

Figure 3:
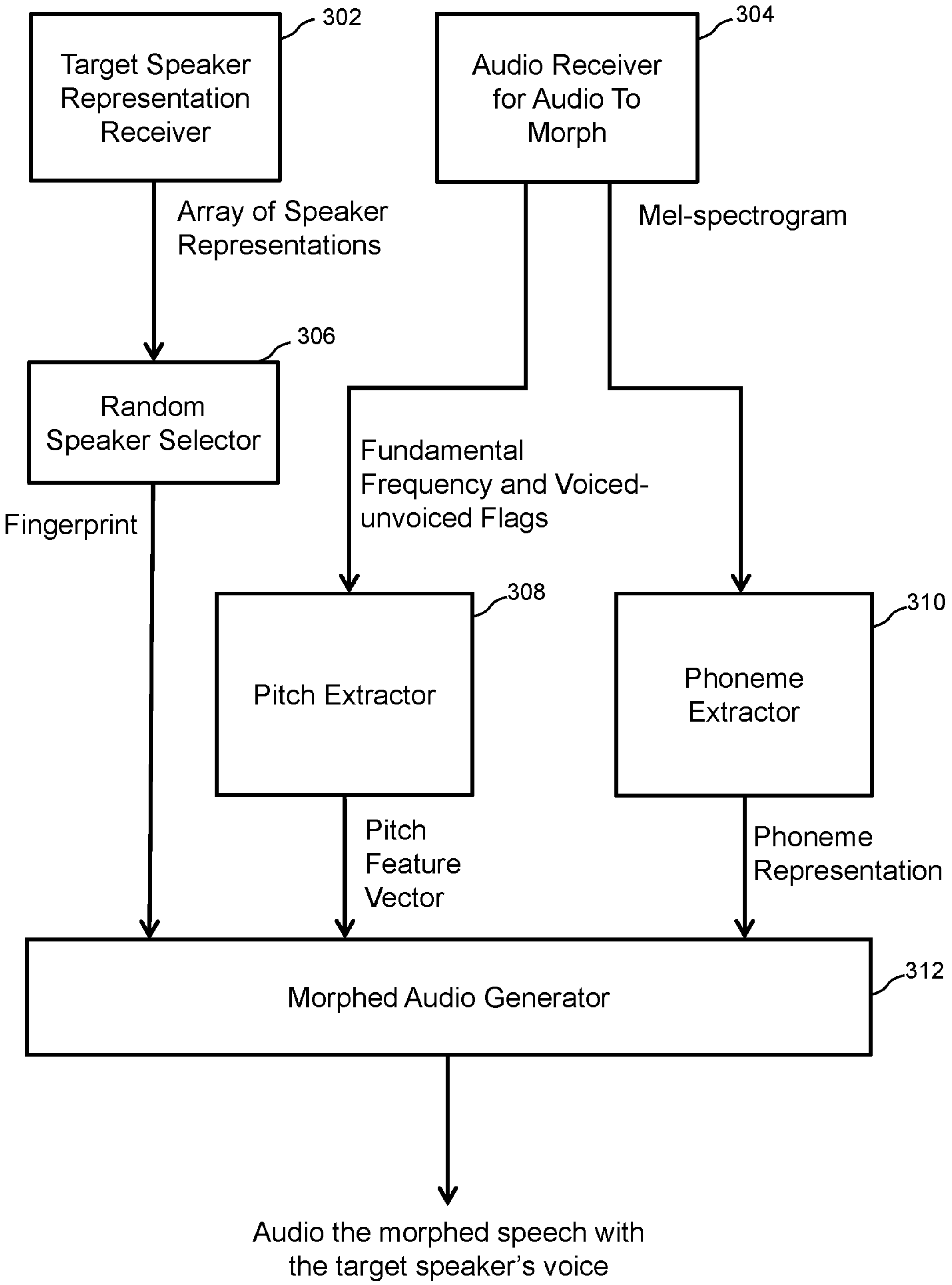
FIG. 3 shows a system's method for creating morphed audio from a user spoken phrase and a target speaker representation using a randomly selected speaker representation in accordance with various examples.

Referring now to FIG. 3, according to one or more examples, a device is shown that creates morphed audio from a user spoken phrase and a target speaker representation using a randomly selected speaker representation. Target speaker representation receiver 302 receives an array of speaker audio where each element in the array represents a different target speaker. Random speaker selector 306 selects a random speaker and creates the target speaker representation (e.g., a fingerprint). According to various examples, random speaker selector 306 may perform the same or similar function as target speaker representation receiver 102. According to various examples, a potential benefit of selecting a random target speaker is to decrease the likelihood that a morphed spoken phrase can be analyzed to determine the identity of the user.

Audio receiver for audio to morph 304 receives a spoken phrase from a user and converts the spoken phrase into a format sent to the pitch extractor and the phoneme extractor. According to various examples, audio receiver for audio to morph 304 performs the same or similar function as audio receiver for audio to morph 104. Pitch extractor 308 extracts pitch from the spoken phrase from the user. According to various examples, pitch extractor 308 performs the same or similar function as pitch extractor 106. Phoneme extractor 310 extracts one or more phonemes from the spoken phrase from the user. According to various examples, phoneme extractor 310 may perform the same or similar function as phoneme extractor 108.

Morphed audio generator 312 generates morphed audio from the spoken phrase from the user to a target speaker voice. According to various examples, morphed audio generator 312 may perform the same or similar function as morphed audio generator 110.

Figure 4:
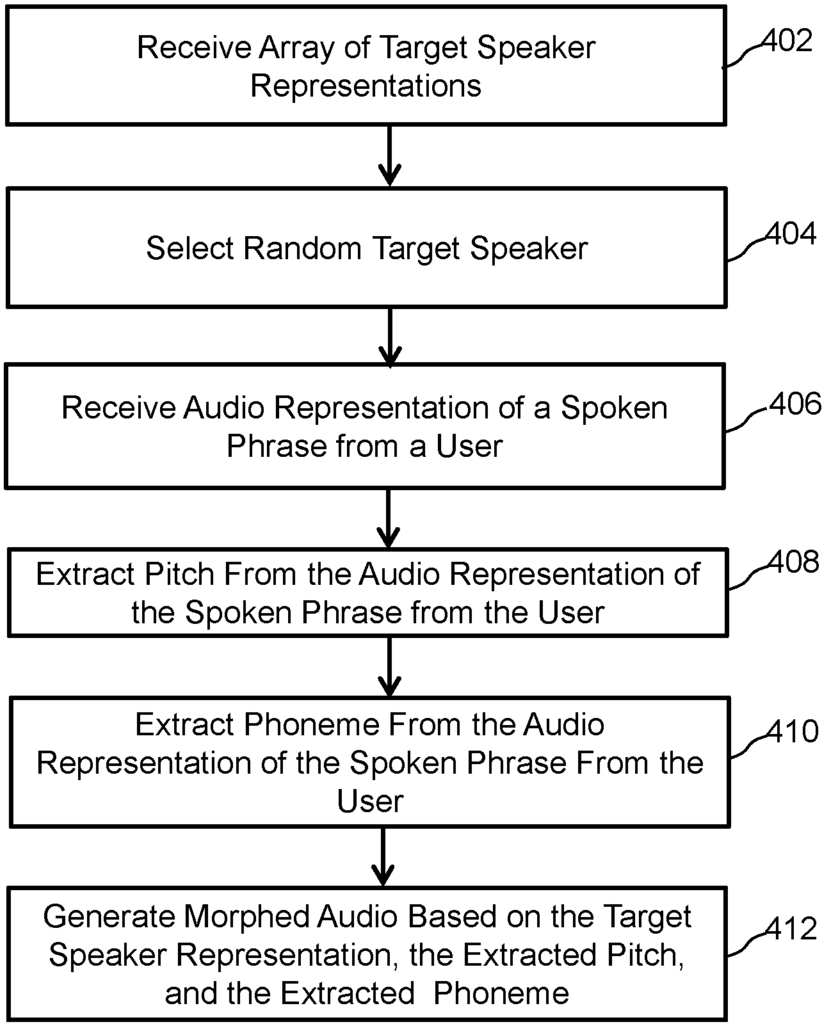
FIG. 4 is a flow diagram showing a method of creating morphed audio from a user spoken phrase and a target speaker representation using a randomly selected speaker representation in accordance with various examples.

Referring now to FIG. 4, according to one or more examples, a process is shown that creates morphed audio from a user spoken phrase and a target speaker representation using a randomly selected speaker representation. At step 402, an array of target speaker audio is received. According to various examples, step 402 may perform the same or similar function as target speaker representation receiver 302. At step 404, a random target speaker is selected and the target speaker representation (e.g., a fingerprint) is created. According to various examples, step 404 may be the same or similar function as random speaker selector 306.

At step 406, a spoken phrase from a user is received and converted to a format for the pitch extractor and the phoneme extractor. According to various examples, step 406 may perform the same or similar function as audio receiver for audio to morph 304. At step 408, pitch is extracted from the audio representation of the spoken phrase from the user. According to various examples, step 408 may perform the same or similar function as pitch extractor 308. At step 410, one or more phonemes are extracted from the audio representation of the spoken phrase from the user. According to various examples, step 410 may perform the same or similar function as phoneme extractor 310. At step 412, morphed audio is generated based on the target speaker representation, the extracted pitch of the audio representation of the spoken phrase from the user, and the extracted phoneme of the audio representation of the spoken phrase from the user. According to various examples, step 412 may perform the same or similar function as morphed audio generator 312.

Figure 5:
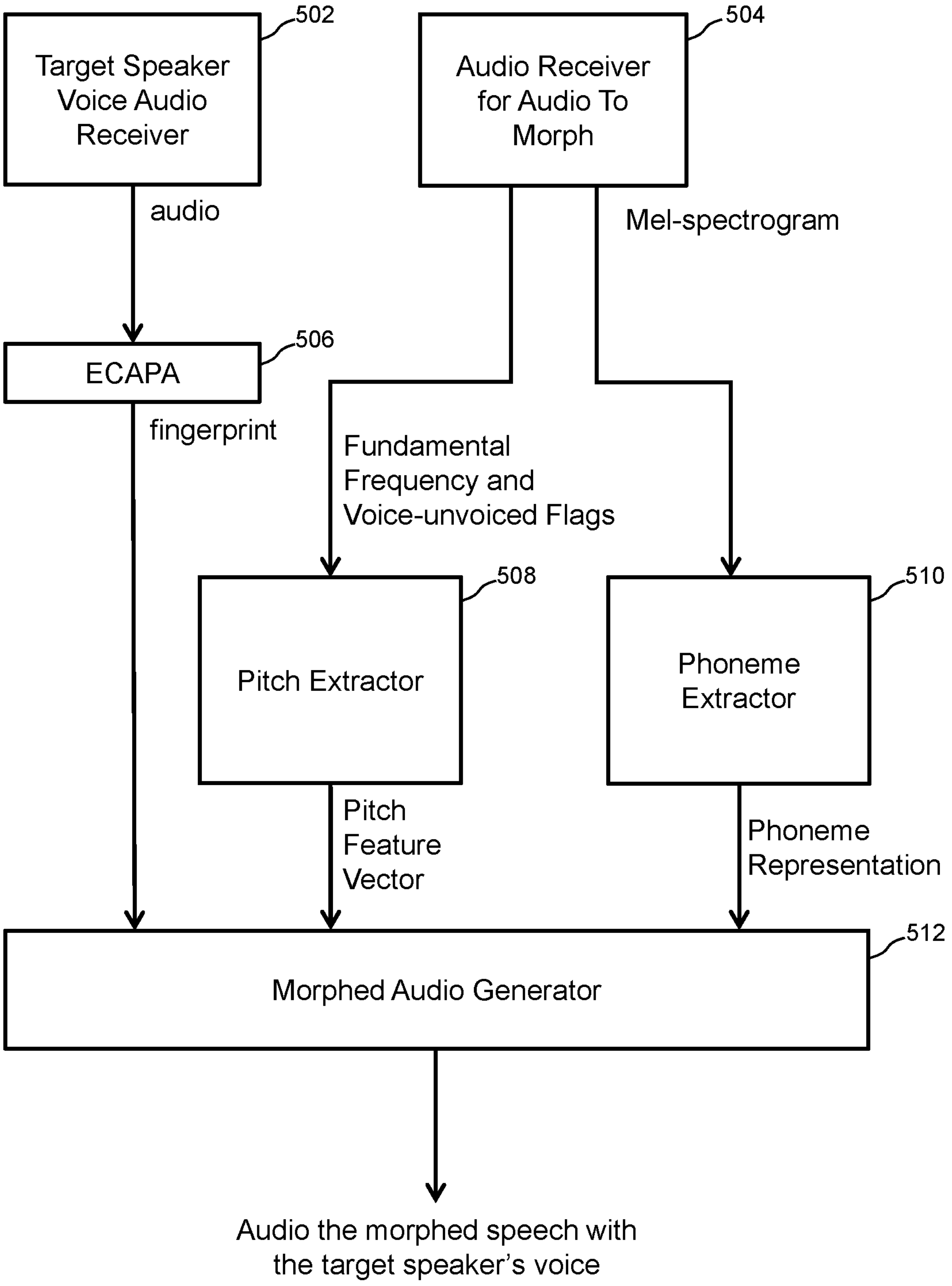
FIG. 5 shows a system's method for creating morphed audio from a user spoken phrase and a target speaker representation using ECAPA in accordance with various examples.

Referring now to FIG. 5, according to one or more examples, a device is shown that creates morphed audio from a user spoken phrase and a target speaker representation using ECAPA. Target speaker voice audio receiver 502 receives target speaker audio. ECAPA 506 creates a target speaker representation (e.g., a fingerprint) from the target speaker voice audio.

Audio receiver for audio to morph 504 receives a spoken phrase from a user and converts the audio from the user to a format for the pitch extractor and the phoneme extractor. According to various examples, audio receiver for audio to morph 504 may perform the same or similar function as audio receiver for audio to morph 104. Pitch extractor 508 extracts pitch from the spoken phrase from the user. According to various examples, pitch extractor 508 performs the same or similar function as pitch extractor 106. Phoneme extractor 510 extracts phonemes from the spoken phrase from the user. According to various examples, phoneme extractor 510 performs the same or similar function as phoneme extractor 108. Morphed audio generator 512 generates morphed audio from the spoken phrase from the user to the voice of a target speaker. According to various examples, morphed audio generator 512 performs the same or similar function as morphed audio generator 110.

Figure 6:
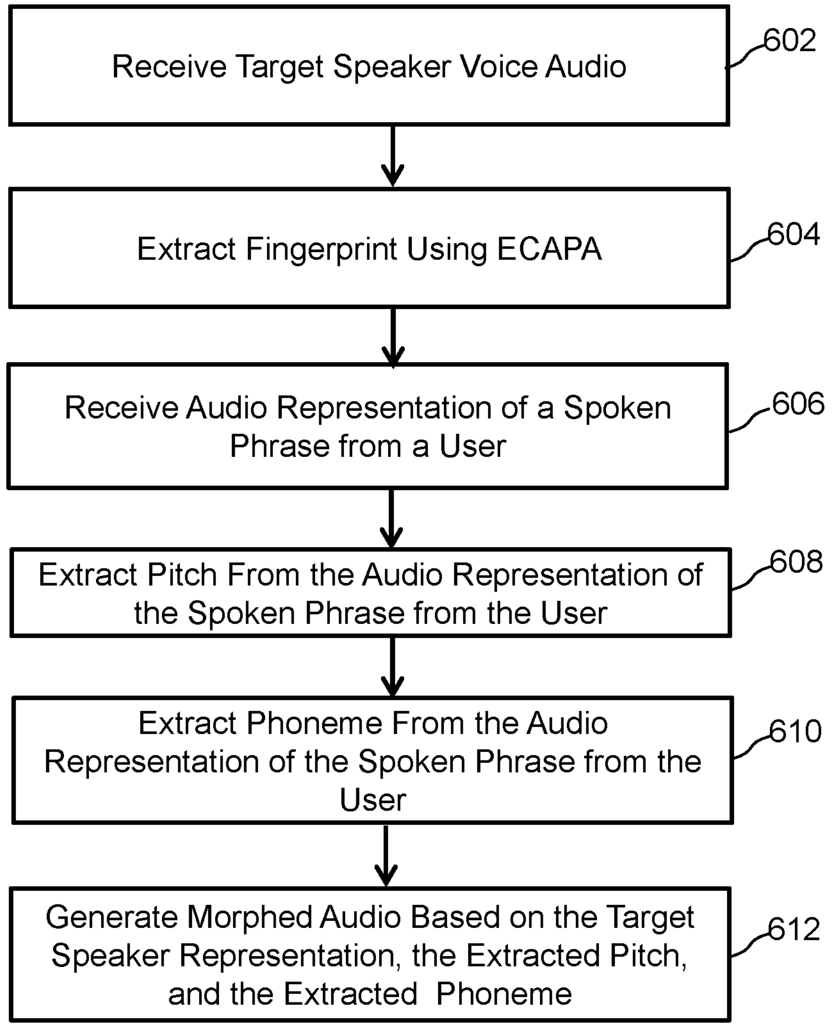
FIG. 6 is a flow diagram showing a method of creating morphed audio from a user spoken phrase and a target speaker representation using ECAPA in accordance with various examples.

Referring now to FIG. 6, according to one or more examples, a process is shown that creates morphed audio from a user spoken phrase and a target speaker representation using ECAPA. At step 602, target speaker audio is received. According to various examples, step 602 may perform the same or similar function as target speaker voice audio receiver 502. At step 604, ECAPA is used to extract a fingerprint from the target speaker audio. According to various examples, step 604 may perform the same or similar function as ECAPA 506.

At step 606, a spoken phrase from a user is received and converted to a format for the pitch extractor and the phoneme extractor. According to various examples, step 606 may perform the same or similar function as audio receiver for audio to morph 504. At step 608, pitch is extracted from the audio representation of the spoken phrase from the user. According to various examples, step 608 may perform the same or similar function as pitch extractor 508. At step 610, one or more phonemes is extracted from the audio representation of the spoken phrase from the user. According to various examples, step 610 may perform the same or similar function as phoneme extractor 510. At step 612, morphed audio is generated based on the target speaker representation, the extracted pitch of the audio representation of the spoken phrase from the user, and the extracted phoneme of the audio representation of the spoken phrase from the user. According to various examples, step 612 may perform the same or similar function as morphed audio generator 512.

Figure 7:
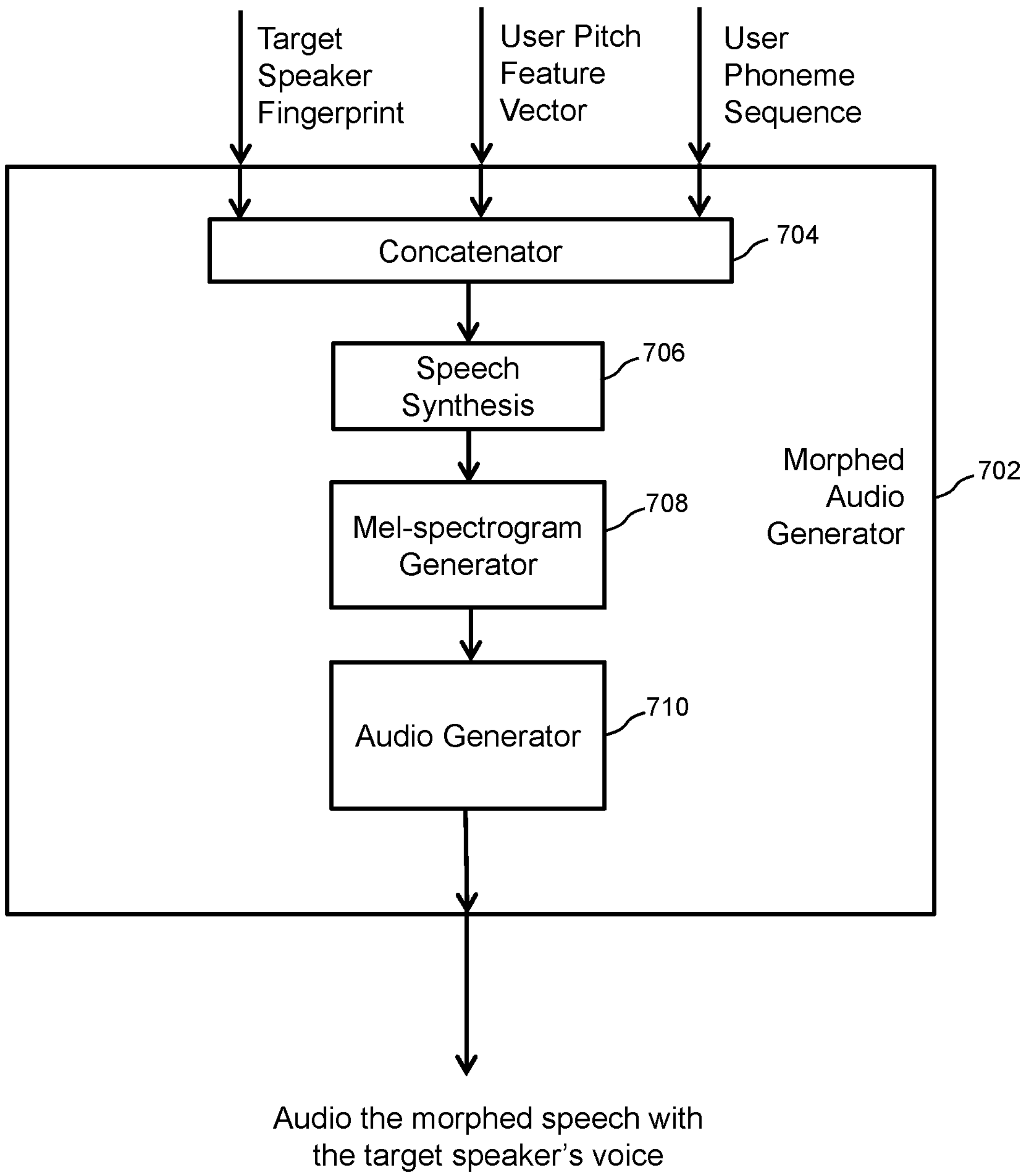
FIG. 7 shows a system's method for generating morphed audio in accordance with various examples.

Referring now to FIG. 7, according to one or more examples, a device is shown that generates morphed audio. Morphed audio generator 702 generates morphed audio from the target speaker fingerprint, user pitch feature vector, and user phoneme sequence. According to various examples, morphed audio generator 702 may perform the same or similar function as morphed audio generator 110. Concatenator 704 concatenates the target speaker fingerprint, user pitch feature vector, and user phoneme sequence. Speech synthesis model 706 receives the concatenated result and synthesizes speech for the user spoken phrase in the voice of the target speaker. According to various examples, speech synthesis model 706 includes a neural network. Mel-spectrogram generator 708 generates a mel-spectrogram from the speech synthesis model 706. Audio Generator 710 receives the mel-spectrogram and generates audio of the morphed user spoken phrase.

Figure 8:
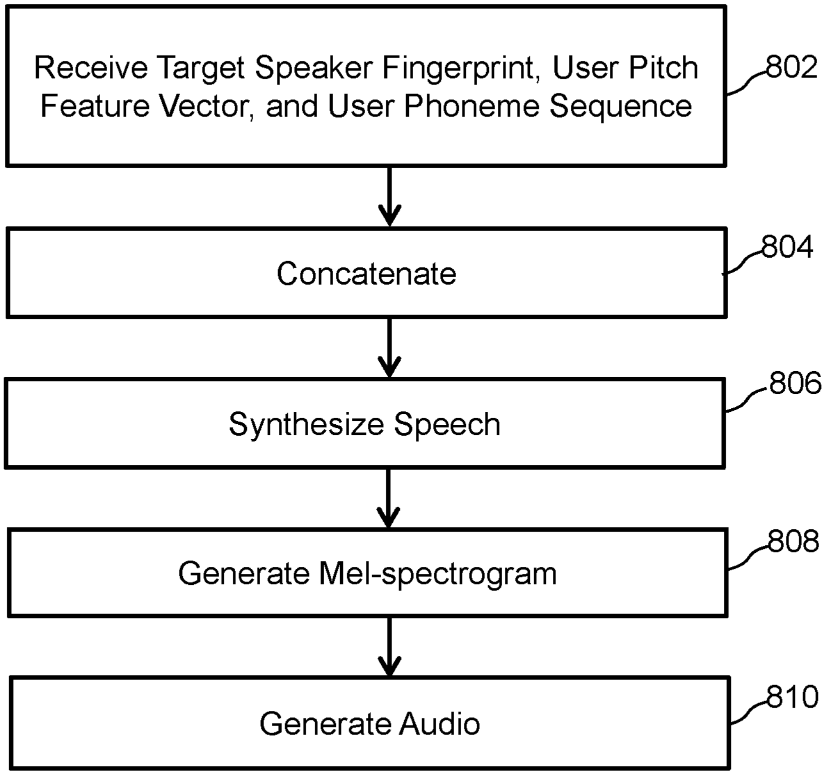
FIG. 8 is a flow diagram showing a method of generating morphed audio in accordance with various examples.

Referring now to FIG. 8, according to one or more examples, a process is shown that generates morphed audio. At step 802, target speaker fingerprint, user pitch feature vector, and user phoneme sequence are received. At step 804, target speaker fingerprint, user pitch feature vector, and user phoneme sequence are concatenated. According to various examples, step 804 may perform the same or similar function as concatenator 704. At step 806, a speech synthesis model synthesizes the spoken phrase from the user in the voice of the target speaker. According to various examples, step 806 may perform the same or similar function as speech synthesis model 706. At step 808, a mel-spectrogram is generated. According to various examples, step 808 may perform the same or similar function as mel-spectrogram generator 708. At step 810, the mel-spectrogram is used to generate audio of the morphed user voice. According to various examples, step 810 may perform the same or similar function as audio generator 710.

Training Voice Morpher

Figure 9:
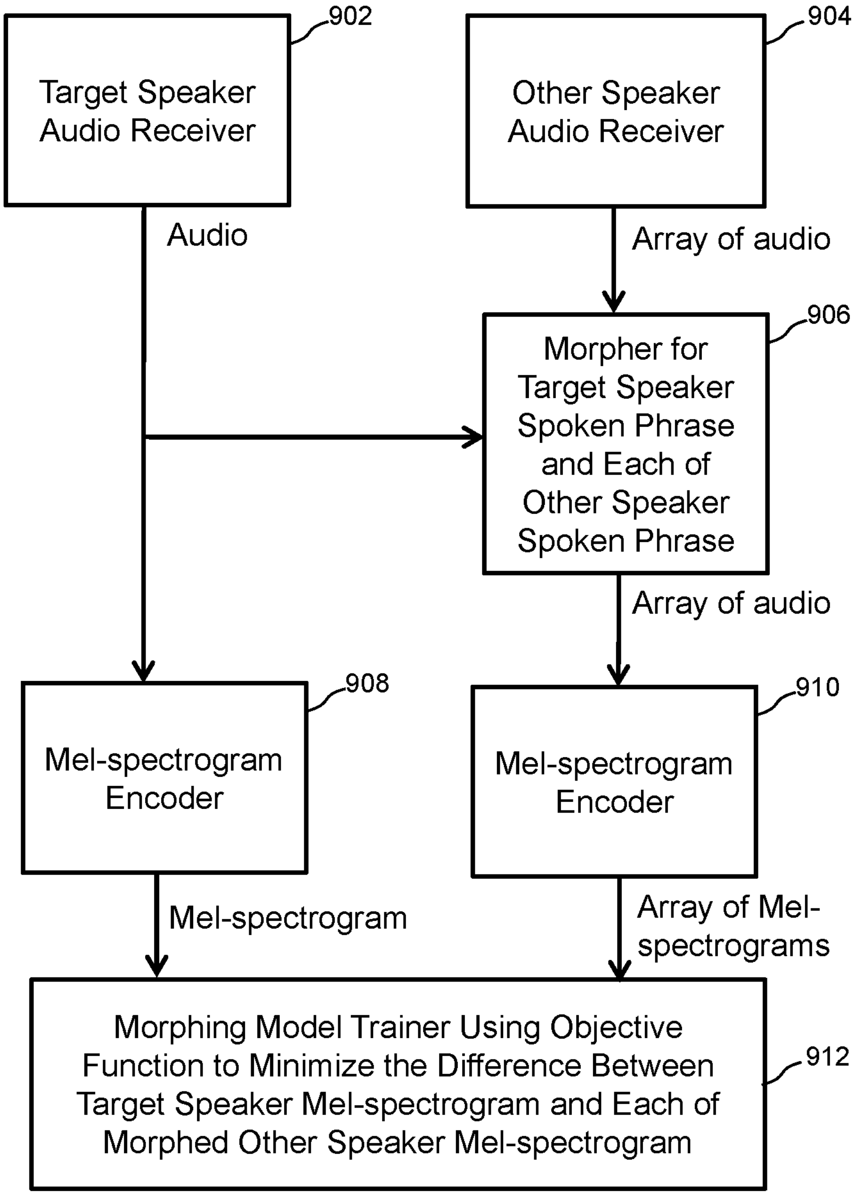
FIG. 9 shows a system's method for training an audio morpher in accordance with various examples.

Referring now to FIG. 9, according to one or more examples, a device is shown that trains an audio morpher. In order to remove and/or reduce the user identifiable information, the audio morpher is trained in such a way that recognizing the sound of the voice of a user from the morphed audio is difficult even reversed with a reversing model. In order to remove and/or reduce the sound of a user's voice, the audio morpher is trained with the object that speaker verification between the input and output audio of the morpher when run on a large number of samples has a nearly random recognition result (50% recognition error rate) and a word recognition error rate that is nearly as low on morphed speech audio as the corresponding input to the morpher. According to various examples, a target speaker speaks a spoken phrase, and another speaker speaks the same spoken phrase, and the audio morpher is trained such that the mel-spectrogram of the output of the morpher is similar to the spectrogram of the target speaker saying the same words. If the morpher is a seq-to-seq model, training with the objective of minimizing the difference between spectrograms works well when the target speaker and the other speaker say the same words, even if they speak at different rates. Training can still be effective even if the spoken phrases have a small number of phoneme differences. Specifically, training can be effective if the phoneme strings of the words spoken in the two phrases is less than a predefined number of phonemes. Similarly, training can be effective if the percent of phonemes differing between the words in the two phrases compared to the total number of phonemes is less than a predefined percentage.

Target speaker audio receiver 902 receives a target speaker spoken phrase and a corresponding fingerprint. Other speaker audio receiver 904 receives spoken phrases from one or more other speakers. Morpher for target speaker spoken phrase and each of other speaker audio 906 creates an array of morphed phrases by morphing each of the other speakers' audio according to the fingerprint of the target speaker. According to various examples, morpher for target speaker phrases and each of other speaker audio 906 performs the same or similar function as audio morpher 100. Mel-spectrogram encoder 908 creates a mel-spectrogram of the target speaker audio. Mel-spectrogram encoder 910 creates an array of mel-spectrograms of the audio morphed from the audio of the other speakers.

The morpher training uses an objective function to minimize the difference between target speaker mel-spectrogram and each of morphed other speaker mel-spectrogram 912 trains the morpher. According to various examples, a training objective function is to minimize the difference between the target speaker mel-spectrogram and each of the other speakers mel-spectrograms. For example, the morpher model is trained such that the mel-spectrogram created from the morpher is similar to the mel-spectrogram of the target speaker. According to various examples, a training objective function is to minimize the mean squared error (MSE) between the values in the frequency bins of target speaker mel-spectrogram and each of the other speakers mel-spectrogram. According to various examples, a training objective is a binary cross-entropy loss on the stop token predictions. According to various examples, the target speaker and the other speakers may speak at different speeds and training includes a step of aligning the training recording audio with the reference recording audio.

For an example, when both the target speaker and the other speaker each speak the phrase "12345", the objective function is to minimize the difference between the morphed mel-spectrogram of "12345" and the target speaker mel-spectrogram of "12345".

Figure 10:
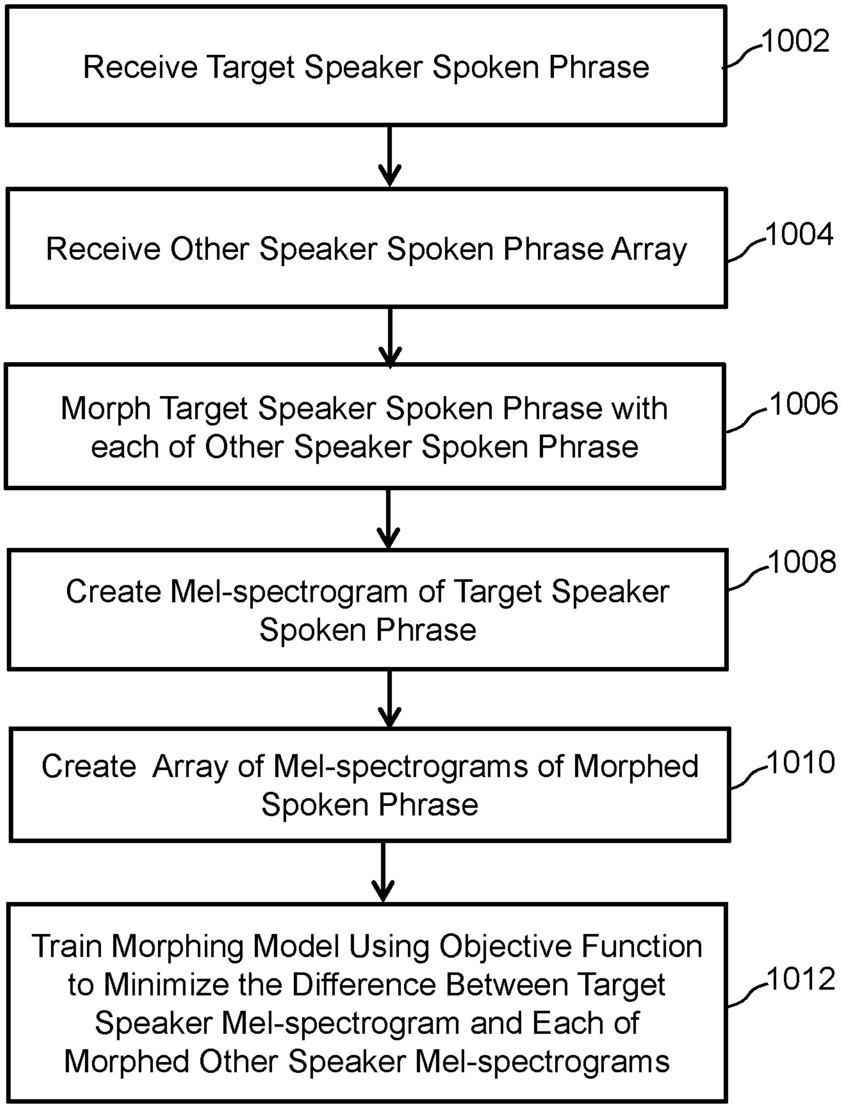
FIG. 10 is a flow diagram showing a method of training an audio morpher in accordance with various examples.

Referring now to FIG. 10, according to one or more examples, a process is shown that trains an audio morpher. At step 1002, a spoken phrase from a target speaker is received. According to various examples, step 1002 may perform the same or similar function as target speaker audio receiver 902. At step 1004, spoken phrases from one or more other speakers are received. According to various examples, step 1004 may perform the same or similar function as other speaker audio receiver 904. At step 1006, an array is created of morphed audio by morphing the audio of the received spoken phrases from other speakers according to a voice fingerprint of the target speaker. According to various examples, step 1006 may perform the same or similar function as morpher for target speaker audio and each of other speaker audio 906. At step 1008, a mel-spectrogram of the target speaker audio is created. According to various examples, step 1008 may perform the same or similar function as mel-spectrogram encoder 908. At step 1010, an array of mel-spectrograms of the audio from the other speakers is created. According to various examples, step 1010 may perform the same or similar function as mel-spectrogram encoder 910. At step 1012, a morpher is trained using an objective function to minimize the difference between target speaker mel-spectrogram and each of morphed other speaker mel-spectrograms. According to various examples, step 1012 may perform the same or similar function as morpher training using objective function to minimize the difference between target speaker mel-spectrogram and each of morphed other speaker mel-spectrogram 912.

Verifying Voice Morpher

Figure 11:
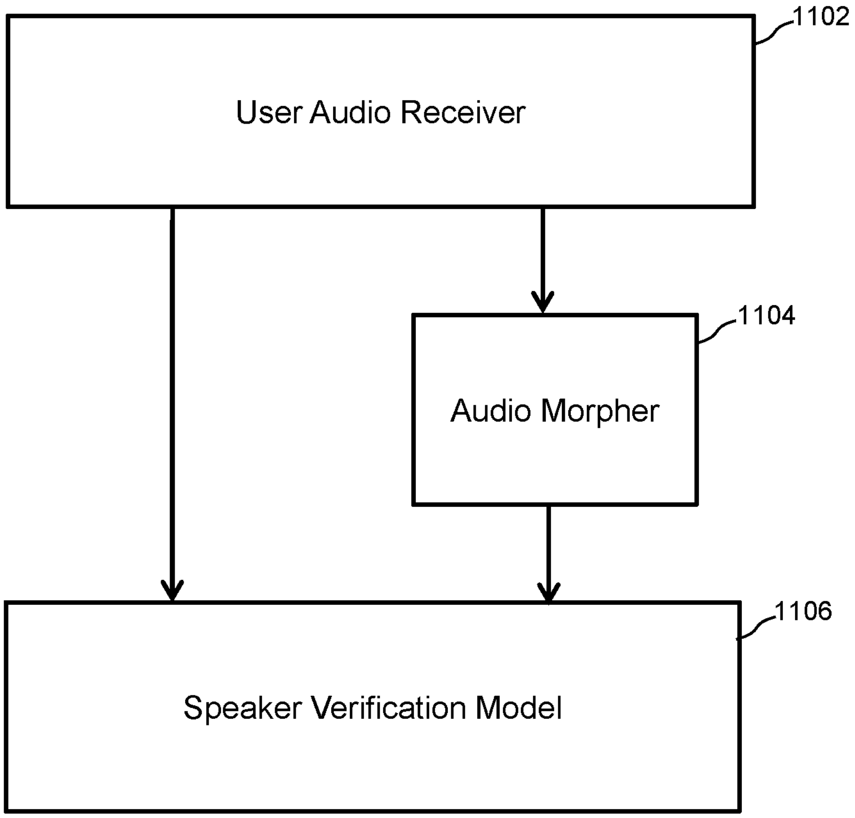
FIG. 11 shows a system's method for verifying an audio morpher in accordance with various examples.

Referring now to FIG. 11, according to one or more examples, a device is shown that verifies an audio morpher. User audio receiver 1102 receives a spoken phrase from a user. Audio Morpher 1104 morphs the received user spoken phrase. According to various examples, audio morpher 1104 may perform the same or similar function as audio morpher 100.

Speaker verification model 1106 predicts if the same speaker that spoke the user phrase is the same speaker that spoke the morphed audio. In other words, speaker verification model 1106 determines a true or false condition of if the same person spoke the user phrase audio and the morphed audio. An effective audio morpher will remove the information useful for identifying a user's voice such that a speaker verification model is unable to recognize an association between the two. In such a case, a speaker verification model essentially makes a random guess as to whether the speaker of the user phrase and the morphed speech are the same person. It should guess that they are the same on 50% of samples and different for 50% of samples. According to various examples, an evaluation metric for the morpher is that speaker verification model 1106 identifies that the speakers of the user phrase audio and the morphed audio are the same speaker 50% of the time and identifies them as being different speakers 50% of the time. According to various examples, speaker verification model 1106 may include a neural network. According to various examples, speaker verification model 1106 extracts the fingerprint from the user audio and morphed audio and compares the fingerprint from the user audio with the fingerprint from the audio morpher. According to various examples, a similarity score is calculated between the audio of the phrase the user spoke and the morphed audio, and the similarity score is used to compare a user's spoken phrase with a pool of speakers where each speaker has spoken a spoken phrase, and the highest similarity score is the most probable user out of the pool of speakers. According to various examples, one can estimate the anonymity of the audio morpher 1104 by calculating an equal error rate (EER) for the speaker verification model 1106 across a large number of samples to see how close it is to 50%. According to various examples, one can estimate the loss of intelligibility of morphed speech by calculating a word error rate (WER) of input audio and output audio of the audio morpher for a large number of data samples. The degradation in WER of morphed audio relative to input audio is a measure of the loss of intelligibility.

Figure 12:
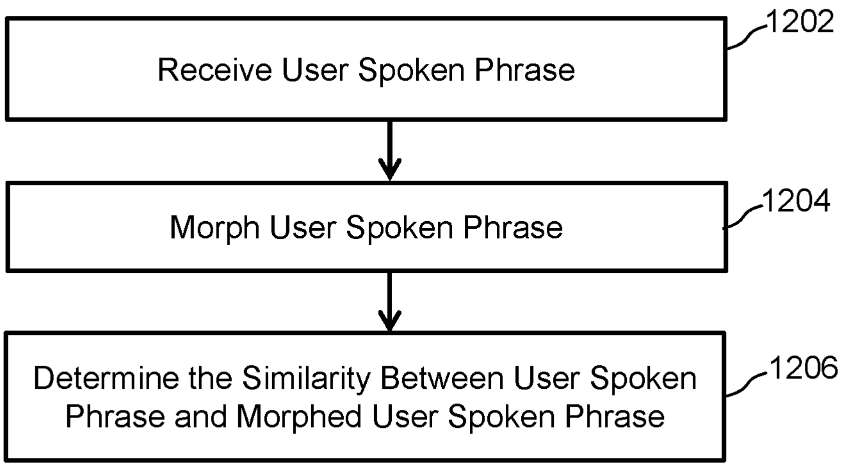
FIG. 12 is a flow diagram showing a method of verifying an audio morpher in accordance with various examples.

Referring now to FIG. 12, according to one or more examples, a process is shown that verifies an audio morpher. At step 1202, a user spoken phrase is received. According to various examples, step 1202 may perform the same or similar function as user audio receiver 1102. At step 1204, the user spoken phrase is morphed. According to various examples, step 1204 may perform the same or similar function as audio morpher 1104. At step 1206, a determination is made if the same speaker that spoke the user phrase is the same speaker that spoke the morphed audio. According to various examples, step 1206 may perform the same or similar function as speaker verification model 1106.

Voice Morpher Application

Figure 13:
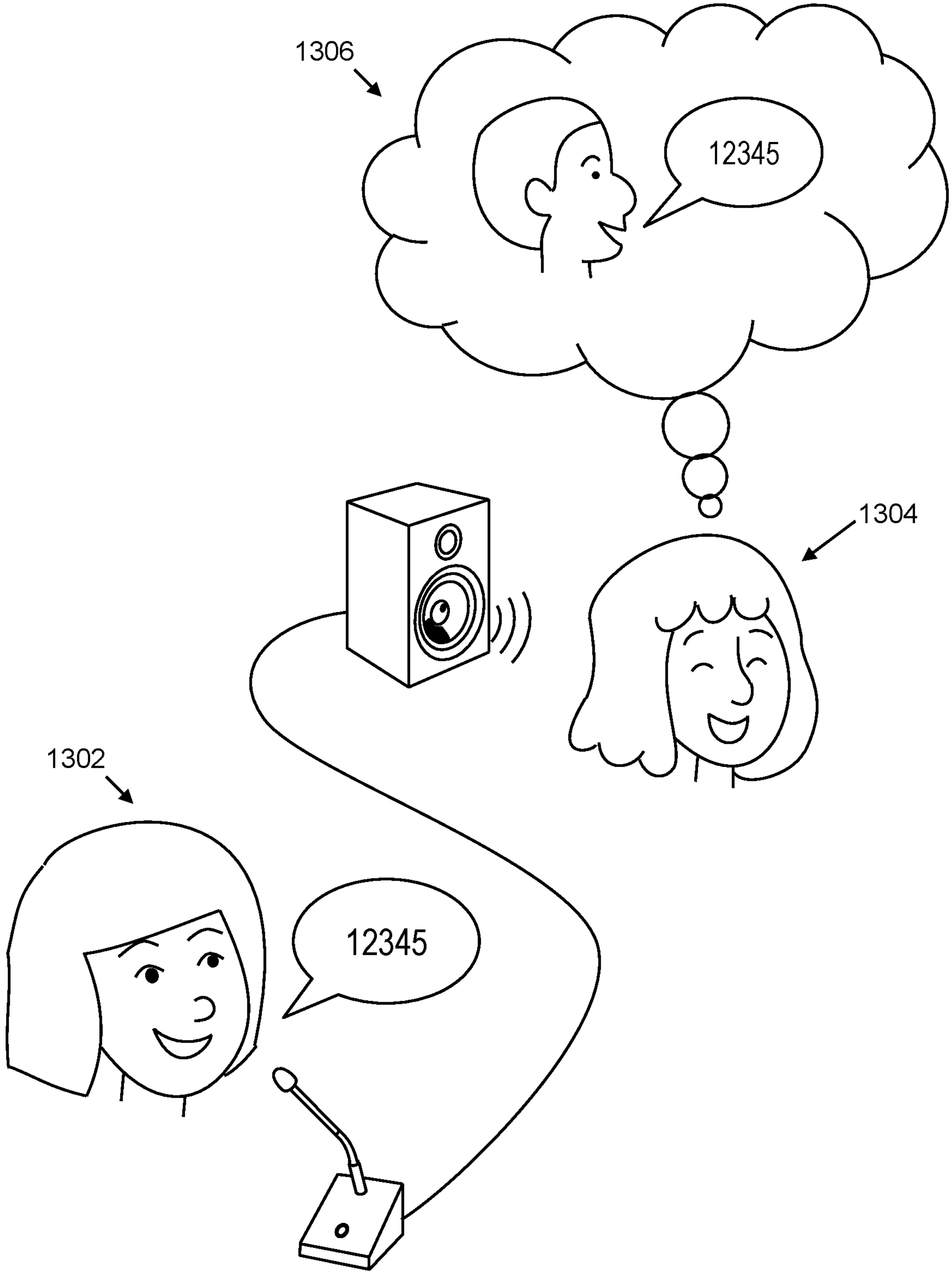
FIG. 13 is an audio morpher that shows a spoken phrase from a user being replaced with the same phrase spoken in the voice of a target speaker in accordance with various examples.

Referring now to FIG. 13, according to one or more examples, an application of the voice morpher is shown. User 1302 speaks the spoken phrase "12345". The spoken phrase "12345" is received by a voice morpher and morphed according to a voice fingerprint of target speaker 1306. When another user 1304 listens to the morphed spoken phrase "12345", user 1304 understands the spoken phrase "12345" and the spoken phrase seems to have been spoken by target speaker 1306. In other words, the spoken phrase spoken by user 1302 seems to have been spoken by target speaker 1306. According to various examples, by hiding the identity of user 1302 from user 1304 using the audio morpher, the identity of user 1302 is protected.

Voice Morpher Non-Transitory Computer-Readable Media

Figure 14:
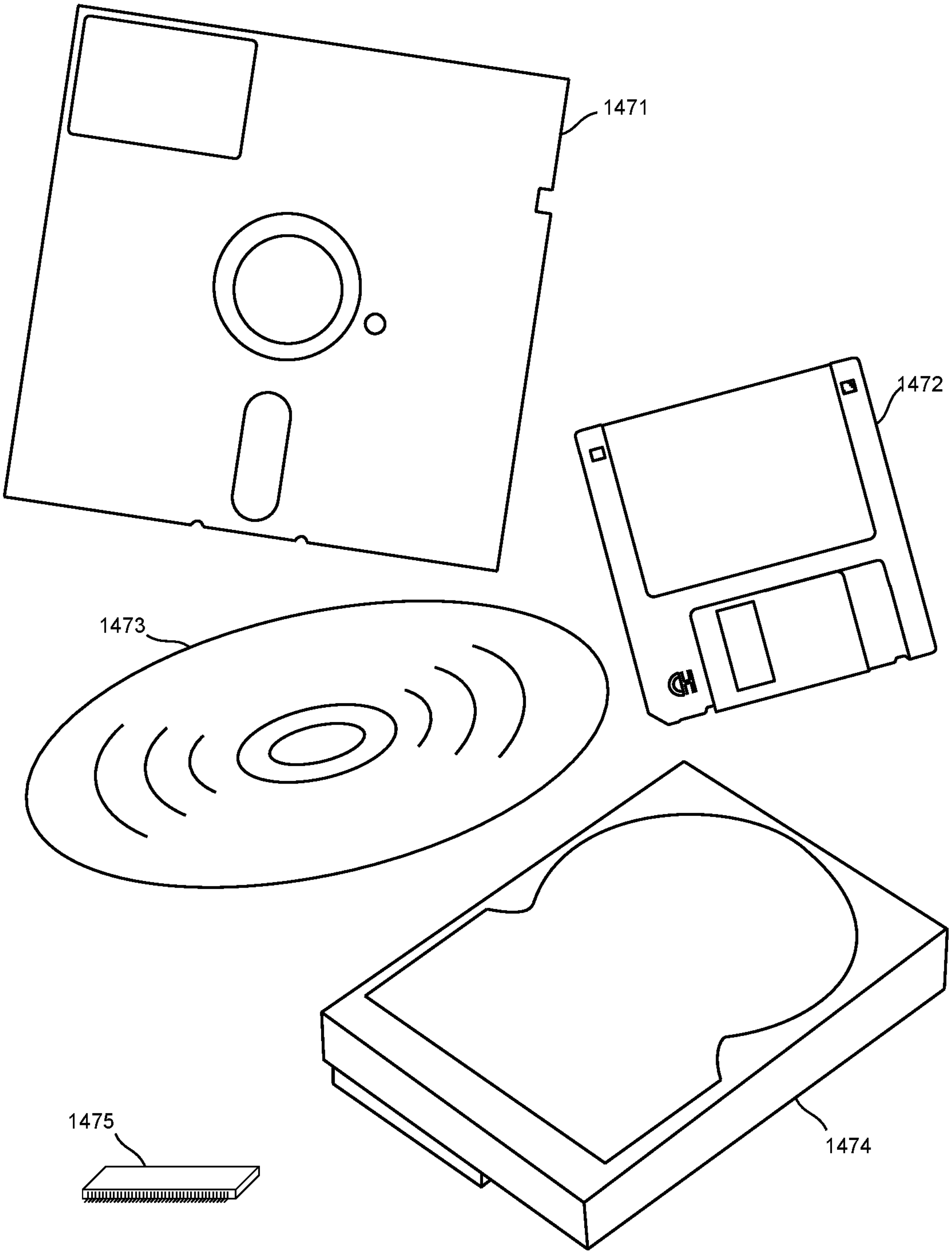
FIG. 14 shows non-transitory computer-readable media for storing instructions that, if executed by one or more computers, would cause the computers to compute a region center by point clustering.

Referring now to FIG. 14, shown is a collection of five non-transitory computer-readable media, any of which can store instructions that, if executed by one or more computers, would cause the one or more computers to perform any of the methods described. The collection has a 5.25-inch floppy disk 1471, a 3.5-inch floppy disk 1472, a compact disc 1473, a hard disk drive 1474, and a Flash random access memory chip 1475.

Some computer systems that perform the methods described function by running software on general-purpose programmable processors (CPUs) such as ones with A1RM or x86 architectures, which are programmable with widely available compilers and open-source software development tools. Some systems use graphics processing units (GPUs), which can, in some cases, deliver higher performance than general-purpose processors. Descriptions herein reciting principles, features, and examples encompass structural and functional equivalents thereof. Practitioners skilled in the art will recognize many modifications and variations. In accordance with the teachings herein, a client device, a computer and a computing device are articles of manufacture. Other examples of an article of manufacture include: an electronic component residing on a motherboard, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

Although certain examples are described, it is apparent that equivalent alterations and modifications will occur to others skilled in the art upon the reading and understanding of this specification and the drawings. Practitioners skilled in the art will recognize many modifications and variations. The modifications and variations include any relevant combination of the disclosed features. In particular regard to the various functions performed by the above described components (assemblies, devices, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments. In addition, while a particular feature may have been disclosed with respect to only one of several embodiments, such feature may be combined with one or more other features of the other embodiments as may be desired and advantageous for any given or particular application.

Some embodiments of physical machines described and claimed herein are programmable in numerous variables, combinations of which provide essentially an infinite variety of operating behaviors. Some embodiments herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines can embody machines described and claimed herein, such as: semiconductor chips; hardware description language representations of the logical or functional behavior of machines according to the invention described and claimed; and one or more non-transitory computer readable media arranged to store such hardware description language representations.

An article of manufacture or system, in accordance with an embodiment of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Furthermore, examples and conditional language recited herein are principally intended to aid the reader in understanding the principles of the invention and the concepts contributed by the inventors to furthering the art and are to be construed as being without limitation to such specifically recited examples and conditions. Moreover, statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

The scope of the invention, therefore, is not intended to be limited to the exemplary embodiments or the various aspects shown and described herein. Rather, the scope and spirit of the present invention is embodied by the appended claims.

What is claimed is:

1. A method for training an audio morpher, the method comprising:
- receiving a target speaker spoken phrase;
- receiving a user spoken phrase;
- extracting, from the user spoken phrase, speech content features representative of linguistic content of the user spoken phrase, including phoneme- related information;
- excluding from use in morphing the user spoken phrase voice characteristics associated with the user, including speaker-specific characteristics used to represent the user's voice;
- computing a target speaker representation of the target speaker;
- morphing, using the audio morpher, the user spoken phrase based on the target speaker representation and the extracted speech content features, without using the excluded user voice characteristics;
- creating a spectrogram of the target speaker spoken phrase;
- creating a spectrogram of the morphed user spoken phrase;
- training the audio morpher with an objective function of minimizing differences between the spectrogram of the morphed user spoken phrase with the spectrogram of the target speaker spoken phrase; and
- training the audio morpher to reduce retention of speaker-specific characteristics associated with the user in the morphed user spoken phrase by excluding user speaker representations from the morphing process.

2. The method of claim 1, wherein the target speaker spoken phrase and the user spoken phrase use the same words.

3. The method of claim 2, wherein training of the audio morpher includes aligning the target speaker spoken phrase and the user spoken phrase.

4. The method of claim 1, wherein the words in the target speaker spoken phrase and the words in the user spoken phrase are similar.

5. The method of claim 4, wherein a percent difference between the number of phonemes in the target speaker spoken phrase and the user spoken phrase is below a predefined percentage.

6. The method of claim 4, wherein training of the audio morpher includes aligning the target speaker spoken phrase and the user spoken phrase.

7. The method of claim 5, wherein the target speaker spoken phrase and the user spoken phrase are different by less than a predefined number of phonemes.

8. A system comprising a processor and memory, wherein the memory stores code that is executed by the processor to cause the system to:
- receive a user spoken phrase;
- extract, from the user spoken phrase, speech content features representative of linguistic content of the user spoken phrase, including phoneme-related information;
- exclude from use in morphing the user spoken phrase speaker-specific voice characteristics associated with the user;
- receive or compute a target speaker representation corresponding to a target speaker;
- morph audio, with an audio morpher, from a user spoken phrase, the user spoken phrase by combining the extracted speech content features with the target speaker representation without using the excluded user voice characteristics, thereby generating a morphed user spoken phrase;
- compare word error rate (WER) of the user spoken phrase and the morphed user spoken phrase to determine intelligibility of the morphed user phrase;
- train the audio morpher using an objective function of minimizing differences between a spectrogram of the morphed user spoken phrase with a spectrogram of speech associated with the target speaker; and
- train the audio morpher such that speaker representations associated with the user are excluded from inputs to the audio morpher during morphing and training, thereby reducing retention of speaker-specific characteristics associated with the user in the morphed user spoken phrase.

9. The system of claim 8, wherein the target speaker voice characteristics are selected at random from an array of target speaker representations.

* * * * *